July 19, 1966  E. E. ALLEN ETAL  3,261,182
FLEXIBLE COUPLING
Filed May 7, 1964
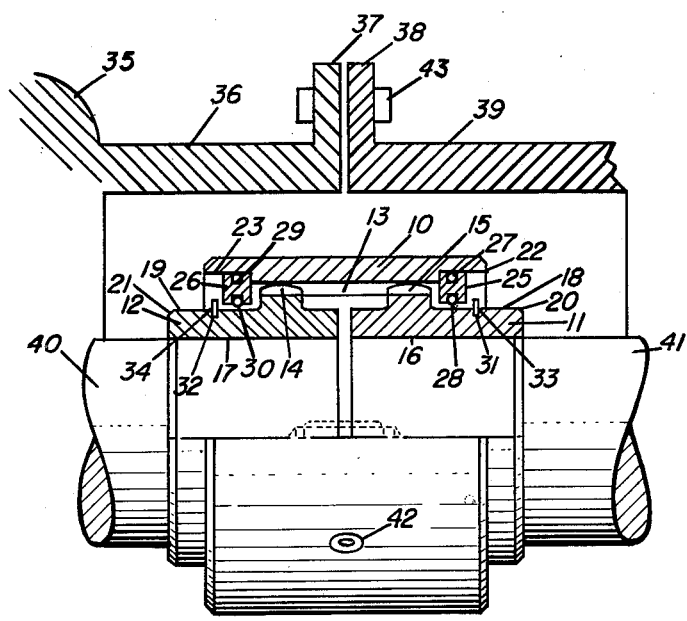
INVENTOR.
EDWARD E. ALLEN
GRANT E. SCOTT JR.
BY

3,261,182
FLEXIBLE COUPLING
Edward E. Allen, Erie, Pa., and Grant E. Scott, Jr., Olean, N.Y., assignors to Zurn Industries, Inc., Erie, Pa., a corporation of Pennsylvania
Filed May 7, 1964, Ser. No. 365,600
5 Claims. (Cl. 64—9)

This invention relates to couplings and, more particularly, to couplings for providing a flexible connection between a drive shaft and a driven shaft.

Often it is desirable to remove a coupling and seal wherein it is impossible to obtain access to the fastening device because of it being enclosed or otherwise inaccessible.

The coupling disclosed herein has particular utility in providing a sealed coupling which can be dismantled without having access to the coupling inside the enclosure.

It is accordingly, an object of the invention to provide an improved coupling which can be dismantled readily in a particular application where the coupling cannot be reached readily or access had thereto.

Another object of the invention is to provide a coupling which is simple in construction, economical to manufacture, and simple and efficient to use.

Still another object of the invention is to provide an improved coupling and drive and driven housing receiving the same.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The drawing shows a coupling in partial cross section with a motor and drive housing shown in phantom around the coupling.

Now with more particular reference to the drawing, the coupling shown has a sleeve 10 that has an outside cylindrical surface and an internal bore with internal teeth 13. The hubs 11 and 12 are received in the sleeve 10 and have the external teeth 14 and 15 which mate with the internal teeth 13 and form driving engagement therewith. The teeth 14 and 15 are of the crowned tooth type such as shown in Patent No. 2,682,740. This allows for lateral misalignment between the shafts 40 and 41.

The hubs 11 and 12 each have an internal bore 16 which may be keyed to the drive shaft 40 and the driven shaft 41. Each hub 11 and 12 has cylindrical external surfaces 18 and 19 which extend outwardly from the external teeth 14 and 15 and provide a bearing surface for the internal O-rings 28 and 30. The sleeve is counterbored at 22 and 23 and the counterbore receives the rings 25 and 26 which are H-shaped in cross section. These rings each have an internal groove and an external groove which receive the O-ring washers 27 and 28 and washers 29 and 30, respectively. The washers 27 and 29 make sealing engagement with the internal cylindrical surfaces formed by counterbore 22 and 23 while O-ring washers 28 and 30 make sealing engagement with the cylindrical surfaces 18 and 19. The internal surfaces of flanges 22 and 23 overlie a part of the cylindrical surfaces 18 and 19.

The grooves 31 and 32 are formed in the hubs outward of the rings 25 and 26 and these grooves 31 and 32 receive snap rings 33 and 34. The snap rings extend outwardly and define a space between the external teeth 14 and 15 and these spaces have the rings 25 and 26 therein.

The motor 35 has an axially extending housing 36 which terminates in a radially extending flange 37. The driven member housing has the axially extending flange 39 and the radially extending flange 38 which are clamped to the flange 37 by means of bolts 43. Thus, it will be seen that when it is desired to remove the drive shaft 41 from the driven shaft 40, it is not necessary to remove the hubs 11 and 12 from the shafts 40 and 41 before the housings can be parted. That is, it is merely necessary to remove the bolts 43. Then the toothed hubs along with the sealing rings 25 can be slipped out of counterbores 21 and 22, the sleeve can be inspected, and whatever necessary repairs can be made on the coupling, and it can be reassembled.

The coupling can be lubricated through the opening 42 which has a suitable sealing plug therein.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A coupling comprising
   a sleeve and two spaced hubs,
   said sleeve having a generally cylindrical bore therein with spaced internal teeth,
   a counterbore in each end of said sleeve defined by an axially extending flange on each end of said sleeve,
   each said hub having external crowned teeth therein,
   said hubs each having a cylindrical portion axially outward of said crowned teeth,
   a generally H-shaped sealing ring in each said counterbore and relatively loosely received on said cylindrical parts of said hubs,
   each said sealing ring having a groove in its outer periphery and a groove in its inner periphery,
   an O-shaped sealing washer in each said groove in said sealing rings,
   a groove in each said hub in said cylindrical part thereof spaced from said teeth,
   a snap ring generally rectangular in cross section in each said groove in said hubs,
   said snap rings and said external teeth defining spaces with said sealing rings therebetween,
   said O-shaped washers making sealing engagement with the outer peripheral surface of said cylindrical portions of said hubs and with the inner periphery of said flanges,
   and means for attaching a shaft to each said hub.

2. The coupling recited in claim 1 wherein
   a two part housing is provided around said coupling,
   said housing having one part fixed against axial movement relative to and movable with one of said hubs,
   and the other part of said housing having releasable means attaching it to said first mentioned part whereby when said releasable means is released, said other part is movable axially of the other of said hubs.

3. In combination, a driving member having a shaft and a flange disposed around said shaft,
   a driven member having a shaft and a flange disposed around said shaft and adapted to be attached to said motor flange,
   and a coupling disposed between said flanges connecting said shafts,
   said coupling comprising a sleeve and two spaced hubs,
   said sleeve having a generally cylindrical bore therein with spaced internal teeth,
   a counterbore in each end of said sleeve defined by an outwardly extending flange on each end of said sleeve, each said hub having external crowned teeth therein,
said hubs each having a cylindrical portion axially outward of said crowned teeth,
a generally H-shaped sealing ring in each said counterbore and relatively loosely received on said cylindrical parts of said hubs,
each said sealing ring having a groove in its outer periphery and a groove in its inner periphery,
an O-shaped sealing washer in each said groove in said sealing rings,
a groove in each said hub in said cylindrical part thereof spaced from said teeth,
a snap ring generally rectangular in cross section in each said groove in said hubs,
said snap rings and said external teeth defining spaces with said sealing rings therebetween,
said O-shaped washers making sealing engagement with the outer peripheral surface of said cylindrical portions of said hubs and with the inner periphery of said flanges,
and means for attaching a shaft to each said hub.

4. The coupling recited in claim 3 wherein said coupling is disposed in a housing, said housing is disposed generally concentric to said sleeve and overlying said sleeve,
one of said hubs and said sleeve being movable axially from said housing whereby said sleeve and hubs may be separated.

5. The coupling and housing recited in claim 4 wherein said housing comprises two separate parts,
said parts each having an outwardly extending flange concentric to said sleeve,
and means removably attaching said flanges together.

References Cited by the Examiner

UNITED STATES PATENTS

| | | | |
|---|---|---|---|
| 2,035,171 | 3/1936 | Loewus | 64—9 |
| 2,943,463 | 7/1960 | Shipley | 64—9 |
| 3,044,280 | 7/1962 | Haneklaus | 64—8 |
| 3,045,453 | 7/1962 | Shenk et al. | 64—9 |

OTHER REFERENCES

German printed application, 1,035,417, July 1958.

MILTON KAUFMAN, *Primary Examiner.*

H. C. COE, *Examiner.*